Sept. 25, 1945.   I. C. RINN   2,385,541
FILM MOUNT AND THE LIKE
Filed Dec. 27, 1940   2 Sheets-Sheet 1

Inventor:
Irwin C. Rinn,

Sept. 25, 1945.　　　　I. C. RINN　　　　2,385,541
FILM MOUNT AND THE LIKE
Filed Dec. 27, 1940　　　　2 Sheets-Sheet 2
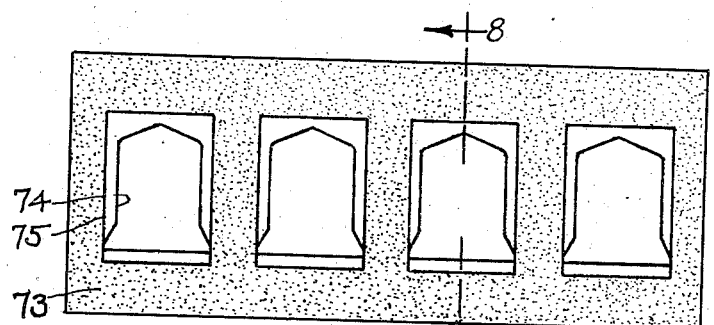
Fig. 7
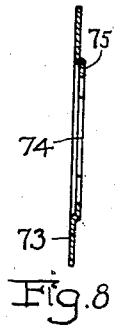
Fig. 8
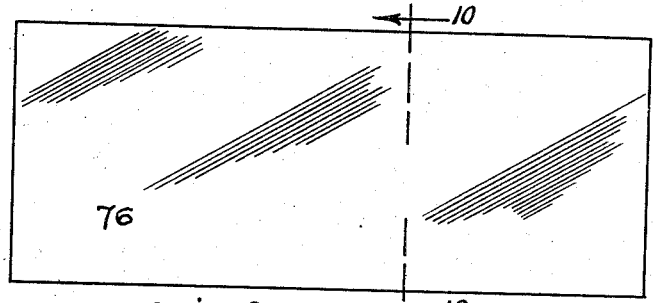
Fig. 9
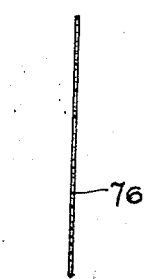
Fig. 10
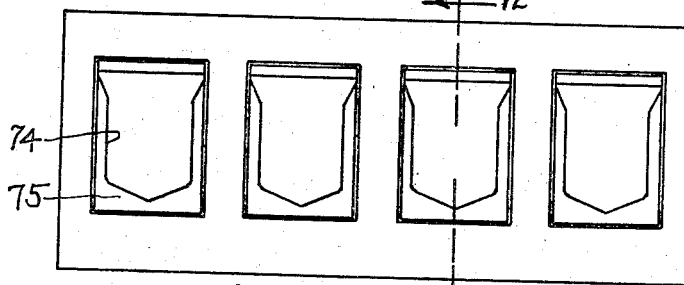
Fig. 11
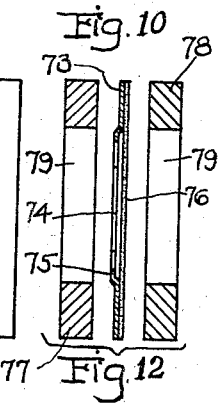
Fig. 12
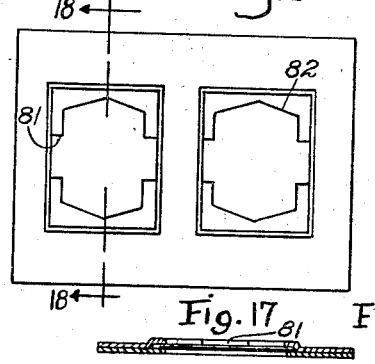
Fig. 17　Fig. 18
Fig. 20
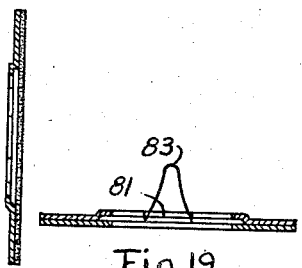
Fig. 19
Inventor:
Irwin C. Rinn,
by Patented Sept. 25, 1945

2,385,541

UNITED STATES PATENT OFFICE 2,385,541

FILM MOUNT AND THE LIKE

Irwin C. Rinn, Chicago, Ill.

Application December 27, 1940, Serial No. 371,985

4 Claims. (Cl. 40—158)

This invention relates to improvements in film mounts and the like, that is, to holders for films which are to be examined or displayed for various purposes. Included in this category are such films as dental X-ray films, these being mentioned merely by way of illustration of one type of film which may be usefully mounted in mounts embodying features of the present invention.

These mounts include two or more sheets of material placed together in face relationship, said sheets being properly cut out or formed so that when so related to each other the proper openings are produced for the windows through which the films are exposed and viewed, and so that the films may be readily introduced into the mounts without damage to the films, and without need of performing difficult operations, and so that when so introduced into the mounts the films will be firmly retained therein and held in place until it is desired to intentionally remove them from the mounts. Generally these sheets are so cemented together, either in double or triple sheet relationship, that suitable narrow margins are left around the window openings of the sheets uncemented together, so that the edge portions of the film (when introduced into place) will be received and accommodated within such uncemented marginal portions, and the films thereby securely and firmly held. It is desired to secure such face to face cementing together of the sheets by such material and in such manner that very close tolerances may be ensured, leaving uncemented exactly the proper amounts and portions of the sheets to ensure accurate formation of the marginal film edge receiving portions. Thereby when the films are introduced into the mounts they will be accurately spaced and centered with respect to the mount windows, a minimum amount of film edge portion will be necessary to ensure proper film reception and retention, a minimum portion of the film surface will be hidden or obscured by the grooves of the mount itself, and it will be possible to so form the mounts that very narrow grooves may be satisfactorily used.

Heretofore it has been the custom and practice to use some form of glue or the like for cementing these mount sheets together. This glue has been spread or applied to the sheet surfaces by suitable means while wet or moist, applying it only to those surface portions which it is intended to cement together, and thereafter the sheets are brought together face to face and suitable pressure is applied to them to ensure adherence of the sheets together. This operation however has necessarily resulted in the squeezing or lateral pressing of some portions of the wet or moist cement beyond the exact limits intended to be cemented together, with the result that when the operation has been completed it has almost invariably been found that a rough or irregular line of cementing has been produced, instead of producing a sharp and exactly defined line of cementing, such as was intended and greatly to be desired.

In addition to the foregoing it has been found that the uncertainty of adhesion between the sheets has also generally resulted in formation of ragged and widely varying lines of adhesion, so that the marginal uncemented grooves around the mount windows have been of uncertain width, ragged, sometimes having quite large lateral protuberances wherein the corners of the films would catch during film introduction or removal, and otherwise seriously objectionable. Furthermore, the very nature of the glue or other similar cementing agent is such that when the pressure is applied between the sheets some portions of this glue will be forced laterally into the intended uncemented groove portion, with production of little obstructions in the groove itself, thereby reducing the width of the groove and sometimes entirely preventing introduction of the film edge into place.

It is also to be noted that glue and similar cementing agents will not adhere to various materials which might be advantageously used in the manufacture of these mounts. For example, for some purposes, and under some conditions, it is desirable to form at least one sheet or layer of the mount from such material as acetate or cellulose or other transparent material; but these materials have heretofore been excluded from use for this purpose for the reason that the glue would not adhere to them.

Furthermore, it is customary to make multiple window film mounts, that is, mounts having two or more, sometimes as many as twelve or fourteen windows for accommodation of as many individual films, such being true, for example in many mounts intended for accommodation and display of dental X-ray films and the like. Now these several window openings are die cut or otherwise formed, usually in rows, and with bars or strips of sheet between the windows. The width of cemented sheet in these bars or strips is waste material insofar as concerns any useful display of the films themselves, and these bars or strips thereby serve to undesirably increase the size of the complete mount, increasing its cost of manufacture and sales price, increasing the size of storage space such as cabinets or drawers or boxes wherein the mounts are filed, and being otherwise objectionable.

One principal feature of the present invention relates to the provision of multiple sheet mounts, that is, mounts formed of two or more sheets, wherein said sheets are adhered together by use of a greatly improved form and composition of adherent, said adherent being remarkably well adapted for this particular use and product. This adherent comprises, by way of illustration, a wax and rubber or latex composition having an adherent non-tacky surface, at ordinary or normal temperatures, but which material when heated under pressure will effectively cement together the sheets of the film mount. Such cementing agent may be provided on the surface of the mount sheet itself, so that when the two or several mount sheets are set together, face to face, in proper registry, and then subjected to heat and pressure over the proper surface area or areas, as by means of a suitably formed die, said sheets will adhere together very firmly and permanently and throughout the entire area prescribed by such die, and with such area of adhesion very accurately defined up to the exact line of the desired groove or other delimiting line. Thereby very accurate and exact manufacturing results may be secured in the manufacture of these film mounts, and numerous other advantages will be secured which will herein appear.

More specifically, I may use as such cementing agent a flexible stretchable base film comprising a wax and a rubber and having an adherent flexible non-tacky coating such as disclosed in Letters Patent of the United States, No. 2,078,172, issued April 30, 1937; or a heat sealing composition comprising 70-94% of paraffin wax having a tensile strength of from 40 to 300 lbs. sq. in., and a melting point of from 120-140 degrees Fah., 6-30% of pale crepe rubber, said composition having imparted thereto a viscosity of at least 8000 secs. (Scott), and being adapted to form moisture proof, waterproof, non-tacky, elastic and flexible films which remain flexible at low temperatures, as disclosed, for example, in Letters Patent of the United States, No. 2,054,112, issued September 15, 1936; but I wish it distinctly understood that by mentioning the foregoing specific examples of a suitable cementing agent for uniting the sheets or layers of the film mounts together I do not intend thereby to limit myself to such specific materials, except as I may do so in the claims to follow herein.

Sometimes I use these paraffin like or rubber like cementing agents by making use of the sheets of the mount coated with such cementing agent, so that when such mount sheets are set together in proper face relationship and subjected to heat and pressure of a suitably formed die the desired adherence will be secured over the desired area. In such case it will generally be found desirable to upset or emboss one or more of such sheets of material around or adjacent to the window or windows, so as to provide the desired space or groove between the sheets for accommodation of the film edge portions.

Other objects and uses of the invention will appear from a detailed description of the same, which consists in the features of construction and combinations of parts, and in the methods and processes of manufacture, hereinafter described and claimed.

In the drawings:

Figure 1 shows a face view of a die-cut blank for a two layer mount embodying features of my present invention, said blank being of material coated or treated on one face with the cementing agent, and the two portions of the blank being die-cut so that they may be folded toegther face to face, and then subjected to the action of a suitably formed heating and pressing die;

Figure 2 shows a cross-section on the line 2—2 of Figure 1, looking in the direction of the arrows; the blank of Figures 1 and 2 being not only die-cut to provide the window openings, but also being embossed or upset so that when the sheets or layers are brought together the desired clearances or grooves will be produced around the window openings for accommodation of the edge portions of the inserted films;

Figure 7 shows a blank for a front sheet or face of still another form of mount embodying features of the present invention, same being die-cut and also embossed, and being made from a single coated sheet of material having only its single face coated with the cementing agent and adapted for cementing contact with another sheet;

Figure 8 shows a cross-section on the line 8—8 of Figure 7, looking in the direction of the arrows;

Figure 9 shows a face view of a sheet of transparent material such as acetate or Celluloid, or other suitable transparent material, either clear or frosted, and either colored or plain, and adapted for cementing to the face of the sheet of Figures 7 and 8. It being noted that this transparent sheet does not need to be die-cut or embossed or otherwise upset;

Figure 10 shows a cross-section on the line 10—10 of Figure 9, looking in the direction of the arrows;

Figure 11 shows a face view of a completed film mount of type embodying the blanks of Figures 7 and 9;

Figure 12 shows a cross-section on the line 12—12 of Figure 11, looking in the direction of the arrows, and it also shows schematically the two heating and pressing dies in position;

Figure 1:
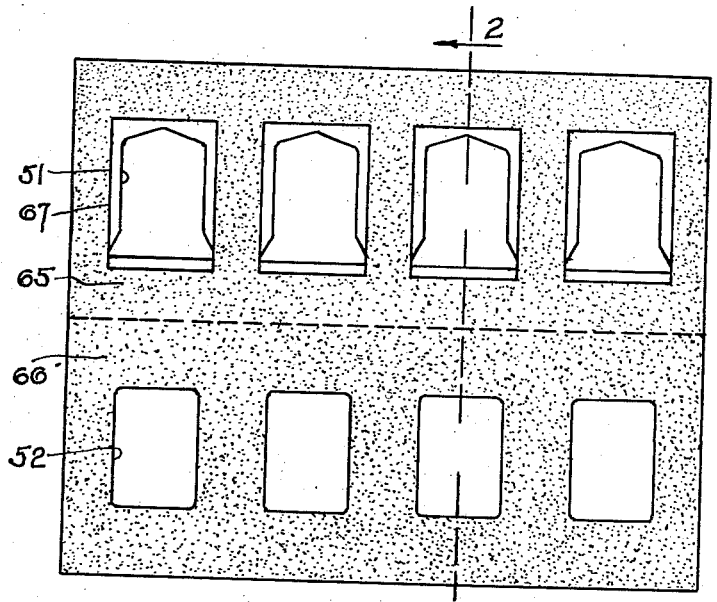
Figure 2:
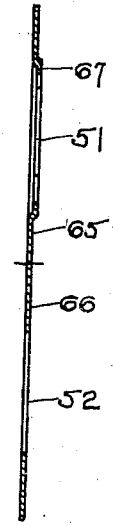
Figure 3:
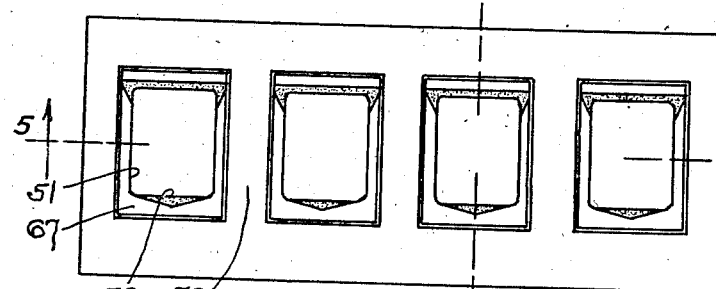
Figure 3 shows a face view of the completed film mount of the form of Figures 1 and 2.
Figure 4:
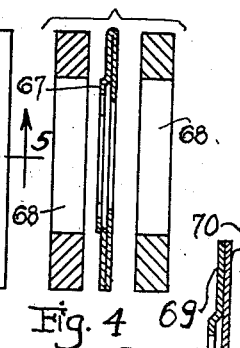
Figure 4 shows a cross-section on the line 4—4 of Figure 3, looking in the direction of the arrows; and it also shows in schematic form a pair of heating and pressing dies to bring about the cementing operations when the layers have been folded together, as shown.
Figures 6, 13, 14, 15, 16:
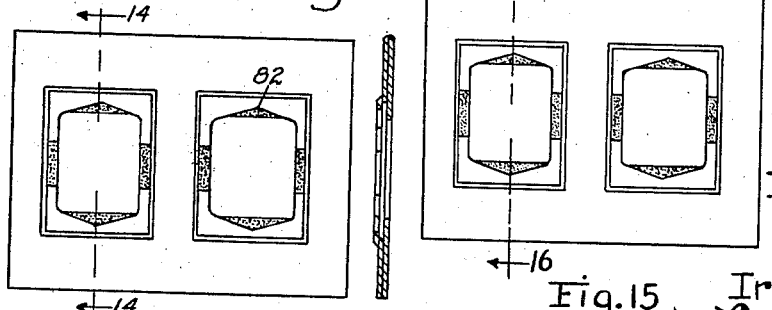
Figure 6 shows a cross-section through another modified form of mount, similar to that of Figure 4, but in this case the front and back layers or sheets have been separated from each other, instead of being a single folded sheet, so that only one of these layers or sheets needs to be single face coated with the cementing material or agent.

Figures 13 to 20, inclusive, show various modified forms of mounts embodying features of the present invention, and all said mounts embodying a modified arrangement or form permitting the introduction of the film into place in their respective window openings, such arrangement being one in which the film is introduced in the central portion of the window, as distinguished from one of the ends of the window as in previously known mounts; and Figures 14, 16 and 18 being cross-sections on Figures 13, 15 and 17, respectively, and taken on the lines 14—14, 16—16 and 18—18 of Figures 13, 15 and 17, respectively, looking in the directions of the arrows; Figures 13 and 14 corresponding to the mount of Figure 4; Figures 15 and 16 corresponding to the mount of Figure 6 and Figures 17 and 18 corresponding to the mount of Figure 12;

Figure 19 shows a section similar to the sections of Figures 14, 16 and 18, showing the manner of introduction of the film into these forms of mounts of Figures 13 to 18, inclusive;

Figure 20 shows a view similar to that of Figure 17, but with the film flattened out and lying in its final position in the mount after having been introduced therein.

In carrying into effect my present invention as respects the cementing agent and its treatment, I make use of one or more of the layers or sheets of material or stock which has been coated or treated on one or both of its faces with the cementing agent or material responding to the requirements that such material is non-tacky at normal temperatures, but adheres strongly to another sheet when applied thereto by heat and pressure; that such material does not flow laterally over the face of the sheet or sheets when so applied in the manner above described; and that such cementing agent is preferably of the general form hereinbefore mentioned. Now, the film mount comprises at least two sheets or layers, including the front and back sheets; and the slight clearance desired between these sheets directly around the window openings may be secured either by proper embossing or upsetting of one or both the sheets, or by use of an interlayer between the front and back sheets proper. Sometimes I use for the front and back sheets stock which has been coated or treated on one face with such cementing agent, such paper or light card-board stock being preferably die-cut in proper manner to establish the window openings for both the front and back of the mount, and the mount being completed by folding such die-cut sheet together. In other cases I may use a non-treated material or stock for these front and back layers, and place an interlayer or sheet between them, in which case such interlayer sheet should preferably be double coated or treated on both its faces with the cementing material. Various arrangements are possible, and some of them I shall now explain in detail;

Referring to the form of construction shown in Figures 1 to 6, inclusive, in this case I produce the entire mount from the two panels 65 and 66 for the front and back faces of the mount, these panels being die-cut with the proper window openings which will come into proper registry when the panels are brought face to face together. In this case, since there is no interlayer or panel it is desirable to emboss or upset one panel, preferably the front panel, around the window openings, as shown at 67, so that when the two panels are brought together there will be produced the desired grooves around the window openings, such grooves being of proper size to receive the side edge portions of the film when inserted into the mount, and to also receive the end portion or portions of the film as well understood in this art. Now it has already been mentioned that these grooves, and particularly the grooves at the sides of the films, should be very accurately formed and sized so that the films will fit with proper snugness but without binding. When the mount is to be made by use of two panels only, and without interlayer or panel, it is more than ever necessary that very accurate cementing should be ensured in order to accurately define these grooves; and due to the fact that the one panel has been embossed or upset the difficulty of securing this result by use of glues or the like is greatly increased, and it is very difficult, if not impossible to secure accurately defined film edge receiving grooves. By this use of the cementing agents herein elsewhere disclosed, making use of heat and pressure, it is possible to secure very accurate and firm adherence between the two sheets or panels, and right up to the commencement of the embossing location, so that even with this type of mount a very perfect result may be commercially secured.

With the arrangement of Figures 1 to 6 inclusive it will be understood that the blank from which the panels 65 and 66 is made should be singly coated or treated with the cementing agent, so that when the panels are brought together face to face the adherence will be produced by application of heat and pressure by use of a die.

In the arrangement shown in Figure 6 the two panels 69 and 70 are separated from each other, at least one being embossed or upset, and the cementing agent may be provided on either one or both of the contacting faces of these panels as desired.

Figure 5:
Figure 5 shows a longitudinal section on the line 5—5 of Figure 3, looking in the direction of the arrows.

Reference to Figure 5 will emphasize the fact that the bars or strips 72 between the consecutive windows should be very evenly and firmly cemented, so as to ensure that the grooves at the sides of the window openings will be accurately formed and sized. Now, when use has been made of glue or the like as in the past, it has been found necessary to form these bars or strips 72 of greater width than would otherwise be necessary, simply to ensure that in case of non-accurate cementing action there will nevertheless remain glued portions between the consecutive window openings. By the use of the cementing agent herein disclosed, whereby it is possible to secure very firm and accurate definition of the cemented areas, I am able to materially reduce the width of these bars or strips between the consecutive windows, and still have assurance of accurate and complete cementing of the unembossed portions of the one sheet to the surface of the other sheet or panel. Thereby I am able to reduce the amount of material necessary to produce the mounts, I am able to reduce the sizes of the mounts themselves, with corresponding reduction of filing and storage spaces, I am able to produce a more attractive looking product, and in many other ways I am able to greatly improve the product and reduce its cost of manufacture.

In the arrangement shown in Figures 9 to 16 inclusive I have shown embodiments of my invention wherein there is only one die-cut or perforated sheet, together with an adjacent sheet of transparent material such as acetate or Celluloid, Cellophane, thin paper, or other suitable material, either clear or frosted, and either plain or colored; and the die-cut or perforated sheet having the window openings is preferably also embossed or upset to produce the desired groove clearances for reception and accommodation of the edge and end portions of the films. In Figures 7 to 12 inclusive there is provided the front sheet or panel 73, having the window openings 74 die-cut therein, and the portions 75 around these window openings are embossed or upset to the proper sizes; and the back face of this blank or panel is coated or treated with the cementing agent as indicated by the stippling in Figure 7. Then the transparent sheet or panel 76 is set against the face of the sheet or panel 73 and by the use of the heating and pressing dies such as 77 and 78 the desired adherence between the coated or treated surface of the non-embossed portion of the panel 73 is caused to adhere firmly and accurately to the transparent panel. In this connection I have found that such cementing agents as hereinelsewhere set out will adhere very strongly to such materials as acetate, Celluloid, Cellophane, thin paper, and others, under application of such degrees of pressure and heat as will not in the least impair these transparent materials or the cementing agents themselves. Furthermore, I have found that such adherence may be effected with a very sharp line of demarcation of the heated and pressed area, so that the desired film edge receiving grooves may be very accurately produced.

Now all of the forms of mounts so far illustrated and described are provided with means to permit insertion and removal of the films, said means comprising a widening or enlargement of one end portion of the window opening. In Figures 13 to 18, inclusive, I have shown a number of mounts embodying the features of my present invention, insofar as concerns the use of a special and satisfactory cementing agent for joining the panels together; but in these forms of Figures 13 to 18, inclusive I have shown another arrangement permitting ready insertion and removal of the films. In these forms, each of the window openings at the front face of the mount is provided with an enlargement comprising a notch or the like 81 in the central portion of each side of the window opening, instead of at the end of the window opening. Then, each end of the window opening is also provided with a slanting or similar end as shown at 82, so that the in-moving film end will engage such end portion with a travelling point of contact, thereby reducing the danger of the film end catching on the end of the window opening.

With this centrally notched form of window opening the procedure in inserting a film is as shown in Figures 19 and 20. As shown in Figure 19 the film should be flexed transversely and centrally as shown at 83, by grasping the film between the thumb and forefinger, setting both ends of the so flexed film down into the notches 81 at the two sides of the window opening, and then allowing the film to straighten out with its side edges moving along the side grooves of the window opening. As the operation is completed the ends of the film will reach the tapered or slanting portions 82 at the ends of the window, and will then travel into the end portions of the grooves in the well understood manner of engagement of a film end with a slanting end wall of the window opening.

Now various forms of film mount details are shown in the embodiments of Figures 13 to 18, and it is deemed unnecessary to describe these in detail, for the reason that these various forms of mounts are shown and described herein in Figures 1 to 12 inclusive with the exception of the central grooving of the side walls of the window openings. I wish to point out at this place, however, that when using the feature of the central notching of the window sides, as distinguished from end openings as in the past, the provision of a continuous, uncut panel of transparent material at the back face of the window opening materially assists in the sliding of the film endwise into its final position, since the end of the film is then sliding over a smooth surface to its destination, said surface extending across the full width of the window opening and giving support to the full width of the travelling film end. This is true, for example, in the arrangements of Figures 17 and 18, of the particular forms illustrated herein.

While I have herein shown and described only certain embodiments of the features of my present invention as concerns the mounts themselves, and also only certain embodiments of apparatus and processes for manufacture of said mounts, still I wish it understood that I do not intend to limit myself to the same, except as I may do so in the claims to follow.

I claim:

1. As a new article of manufacture, a mount for the purpose specified, comprising at least two panels, one being a front panel and the other being a back panel, said panels having registering window openings, and the front panel being embossed around the window opening thereof to thereby set out the material of said panel for a marginal portion of said panel around said window opening to thereby establish a marginal groove between the panels and around the window opening, said groove being adapted to receive the edge portion of a film inserted between the panels and in registry with the window opening, the opening of one panel being provided with extensions on two opposite edges suitably located to pass the edge portions of a film being inserted into or removed from the marginal groove aforesaid, together with means to cement or adhere the two panels together face to face in all portions of said panels which come together face to face and around the entire periphery of the window, said means comprising paraffin like material on the contacting surfaces of the panels and adhering said surfaces together by application of heat and pressure, substantially as and for the purpose set forth.

2. As a new article of manufacture, a mount for the purpose specified, comprising a front embossed panel having a window opening within the embossed portion thereof, said panel being flat except in said embossed portion, together with a back panel in face contact with the non-embossed portion of said front panel and comprising a sheet of Cellophane or like transparent material, the opening of the embossed panel being provided with extensions on two opposite edges suitably located to pass the edge portions of a film being inserted into or removed from the space between the panels, and means to cement said panels together in their contacting surfaces and around the entire periphery of the window, comprising paraffin like material on the contacting surfaces of the panels and adhering said srufaces together by application of heat and pressure, substantially as and for the purpose set forth.

3. As a new article of manufacture, a mount for the purpose specified, comprising at least two panels, one being a front panel and the other being a back panel, said panels having registering window openings, and the front panel being embossed around the window opening thereof to thereby set out the material of said panel for a marginal portion of said panel around said window opening to thereby establish a marginal groove between the panels and around the window opening, said groove being adapted to receive the edge portion of a film inserted between the panels and in registry with the window opening, the opening of one panel being provided with means adapted to pass the edge portions of a film being inserted into or removed from the mount, together with means to cement or adhere the two panels together face to face in all portions of said panels which come together face to face around the entire periphery of the window, said means comprising paraffin like material on the contacting surfaces of the panels and adhering said surfaces together by application of heat and pressure, substantially as described.

4. As a new article of manufacture, a mount for the purpose specified, comprising a front embossed panel having a window opening within the embossed portion thereof, said panel being flat except in said embossed portion, together with a back panel in face contact with the non-embossed portion of said front panel and comprising a sheet of Cellophane or like material, the opening of the embossed panel being provided with means adapted to pass the edge portions of a film being inserted into or removed from the mount, and means to cement said panels together in their contacting surfaces and around the entire periphery of the window, comprising paraffin like material on the contacting surfaces of the panels and adhering said surfaces together by application of heat and pressure, substantially as and for the purpose set forth.

IRWIN C. RINN.